(12) United States Patent
Offen et al.

(10) Patent No.: US 8,150,974 B2
(45) Date of Patent: Apr. 3, 2012

(54) CHARACTER DIFFERENTIATION SYSTEM GENERATING SESSION FINGERPRINT USING EVENTS ASSOCIATED WITH SUBSCRIBER ID AND SESSION ID

(75) Inventors: Russell Offen, Ottawa (CA); Kelvin Edmison, Ottawa (CA); Rob Gaudet, Ottawa (CA)

(73) Assignee: Kindsight, Inc., Sunnyvale, CA (US)

( * ) Notice: Subject to any disclaimer, the term of this patent is extended or adjusted under 35 U.S.C. 154(b) by 198 days.

(21) Appl. No.: 12/726,295

(22) Filed: Mar. 17, 2010

(65) Prior Publication Data

US 2010/0241745 A1  Sep. 23, 2010

Related U.S. Application Data

(60) Provisional application No. 61/160,919, filed on Mar. 17, 2009.

(51) Int. Cl.
G06F 15/16 (2006.01)
(52) U.S. Cl. ......... 709/227; 709/228; 709/229; 709/224
(58) Field of Classification Search .................. 709/227, 709/228, 229, 224, 204, 236; 726/27, 2, 726/10, 28, 29; 713/171
See application file for complete search history.

(56) References Cited

U.S. PATENT DOCUMENTS

| | | | |
|---|---|---|---|
| 6,189,002 B1 | 2/2001 | Roitblat | |
| 6,839,680 B1 | 1/2005 | Liu et al. | |
| 2003/0037163 A1* | 2/2003 | Kitada et al. | 709/236 |
| 2003/0083938 A1 | 5/2003 | Smith et al. | |
| 2005/0091367 A1* | 4/2005 | Pyhalammi et al. | 709/224 |
| 2007/0276940 A1 | 11/2007 | Abraham et al. | |
| 2008/0028067 A1 | 1/2008 | Berkhin et al. | |
| 2008/0255944 A1 | 10/2008 | Shah et al. | |
| 2009/0182809 A1* | 7/2009 | Ben-Ezra et al. | 709/204 |
| 2009/0193253 A1* | 7/2009 | Falk et al. | 713/171 |
| 2009/0228988 A1* | 9/2009 | Jeong et al. | 726/27 |
| 2009/0248494 A1 | 10/2009 | Hueter et al. | |
| 2010/0050241 A1* | 2/2010 | Yan et al. | 726/5 |
| 2010/0138370 A1 | 6/2010 | Wu et al. | |

FOREIGN PATENT DOCUMENTS

| | | |
|---|---|---|
| DE | 100 36 734 A1 | 2/2002 |
| WO | 2010/048980 A1 | 5/2010 |

OTHER PUBLICATIONS

Republic of France, Preliminary Search Report and Written Opinion for Registration No. FR1002572, filed Jun. 17, 2010, with English translation, 22 pages.

* cited by examiner

Primary Examiner — Le Luu
(74) Attorney, Agent, or Firm — Osha • Liang LLP

(57) ABSTRACT

A method and apparatus for character differentiation based on pattern recognition is provided. A sequence of events is received that have been generated from a given session or connection and determines if the sequence of events is likely to have come from an existing, known character, or if the events are from a previously unknown character. A character identifier (ID) is tagged onto (i.e. associated with) the event for further processing in another system that can, for example, provide different content based on the identified character and an associated preference profile.

20 Claims, 5 Drawing Sheets

CHARACTER DIFFERENTIATION SYSTEM GENERATING SESSION FINGERPRINT USING EVENTS ASSOCIATED WITH SUBSCRIBER ID AND SESSION ID

CROSS-REFERENCE TO RELATED APPLICATIONS

This application claims priority, under 35 U.S.C. §119(e), to U.S. Provisional Patent Application Ser. No. 61/160,919, filed on Mar. 17, 2009. U.S. Provisional Patent Application Ser. No. 61/160,919 is hereby incorporated by reference in its entirety.

TECHNICAL FIELD

The present disclosure relates to on-line content delivery and in particular to character differentiation from an on-line communication event stream to attribute sets of events within the streams to a particular character to enable targeted content delivery.

BACKGROUND

With the proliferation of the use of information communications mechanisms such as, for example, the Internet and digital television (TV), it is desirable to be able to deliver content (e.g. advertisements) to a user of the information communications mechanism that is particularly relevant (i.e. is targeted) to the user. In a typical household there can be multiple users (i.e. persons), using and/or sharing multiple platforms (e.g. personal computers, different browsers, media players, and set-top boxes), which share a single connection (e.g. Digital Subscriber Line (DSL), or cable modem) to an information communications mechanism (e.g. Internet Service Provider (ISP) network). Given that most users are reluctant to accept invasive data collecting and reporting elements (e.g. agents) on their computing platforms, differentiation of the users in a single household must be accomplished by observing the aggregate data stream (i.e. data traffic) within the information communications mechanism (e.g. ISP network or digital TV network).

A typical approach to attributing (i.e. associating) portions of the data traffic to each of a plurality users for the purposes of Internet advertising has been through the use of Hypertext Transfer Protocol (HTTP) cookies (a.k.a. Web cookies). Cookies are parcels of text sent by a server to a Web client (typically a browser) and then sent back unchanged by the client each time it accesses that server.

The use of cookies to associate data traffic with individual users has a number of shortcomings including:
  Multiple users can share the same computer, login session, or browser and therefore will share cookies as well;
  The same user can use multiple combinations of computers, login sessions and browsers, each with a unique set of cookies and no association between the sets of cookies;
  User can delete cookies at any time resulting in the assignment of a new cookie from a given server with no association with any previously deleted cookie from that server; and
  In some cases cookies associated only with particular websites have been used resulting in associations that reflect only a subset of the network (e.g. the Internet).

Accordingly, there is a highly desirable need for improved identification of characters sharing the same access point.

SUMMARY OF INVENTION

In accordance with an aspect of the present disclosure there is provided a method of character differentiation of on-line communications originating from a subscriber access point coupled to a network. The method comprising: receiving user generated events from one of a plurality of computing devices coupled to the access point, each event associated with a subscriber identification (ID) and a session identification (ID), the events generated by a communication session between one of the plurality of computing devices and a communication endpoint through the network; generating a session fingerprint using a plurality of received events for the associated subscriber ID and session ID wherein the session fingerprint comprises a feature vector based upon data contained in the received events; and storing a character record comprising the generated fingerprint, an associated character identifier (ID) and the subscriber ID.

In accordance with an aspect of the present disclosure there is also provided a character identification apparatus for character differentiation of on-line communications originating from a subscriber access point coupled to a network. The module comprising: a processor; a memory providing instructions for execution by the processor, the instructions for: receiving user generated events from one of a plurality of computing devices coupled to the access point, each event associated with a subscriber identification (ID) and a session identification (ID), the events generated by a communication session between one of the plurality of computing devices and a communication endpoint through the network; generating a session fingerprint using a plurality of received events for the associated subscriber ID and session ID wherein the session fingerprint comprises a feature vector based upon data contained in the received events; and storing a character record comprising the generated fingerprint, an associated character identifier (ID) and the subscriber ID.

Other aspects and features of the present disclosure will become apparent to those ordinarily skilled in the art or science to which it pertains upon review of the following description of specific embodiments of the disclosure in conjunction with the accompanying figures.

BRIEF DESCRIPTION OF DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Embodiments are described below, by way of example only, with reference to FIGS. 1 to 5.

A method, apparatus and system for character differentiation based on pattern recognition is provided. A sequence of events is observed that have been generated from a given session or connection and determines if the sequence of events is likely to have come from an existing, known character, or if the events are from a previously unknown character. A character identifier (ID) is tagged onto (i.e. associated with) the event for further processing in another system that can, for example, provide different content based on the identified character and an associated preference profile. Identification of a character or a personality associated with a data stream helps in identifying potential individual users associated with unique browsing or interaction sessions originating from a subscriber such as a household. The ability to identify unique characters or personalities enables appropriate content to be selected and delivered to the user by selecting an appropriate content preference profile. Each user may be associated with one or more character identifiers based upon their browsing or content preferences which may vary based upon any number of factors such as the type of device being used for interaction, time of day, type of content being accessed, or source of content (connection endpoint). In addition, a single character may be associated with more than one user if their browsing profiles are similar.

Figure 1:
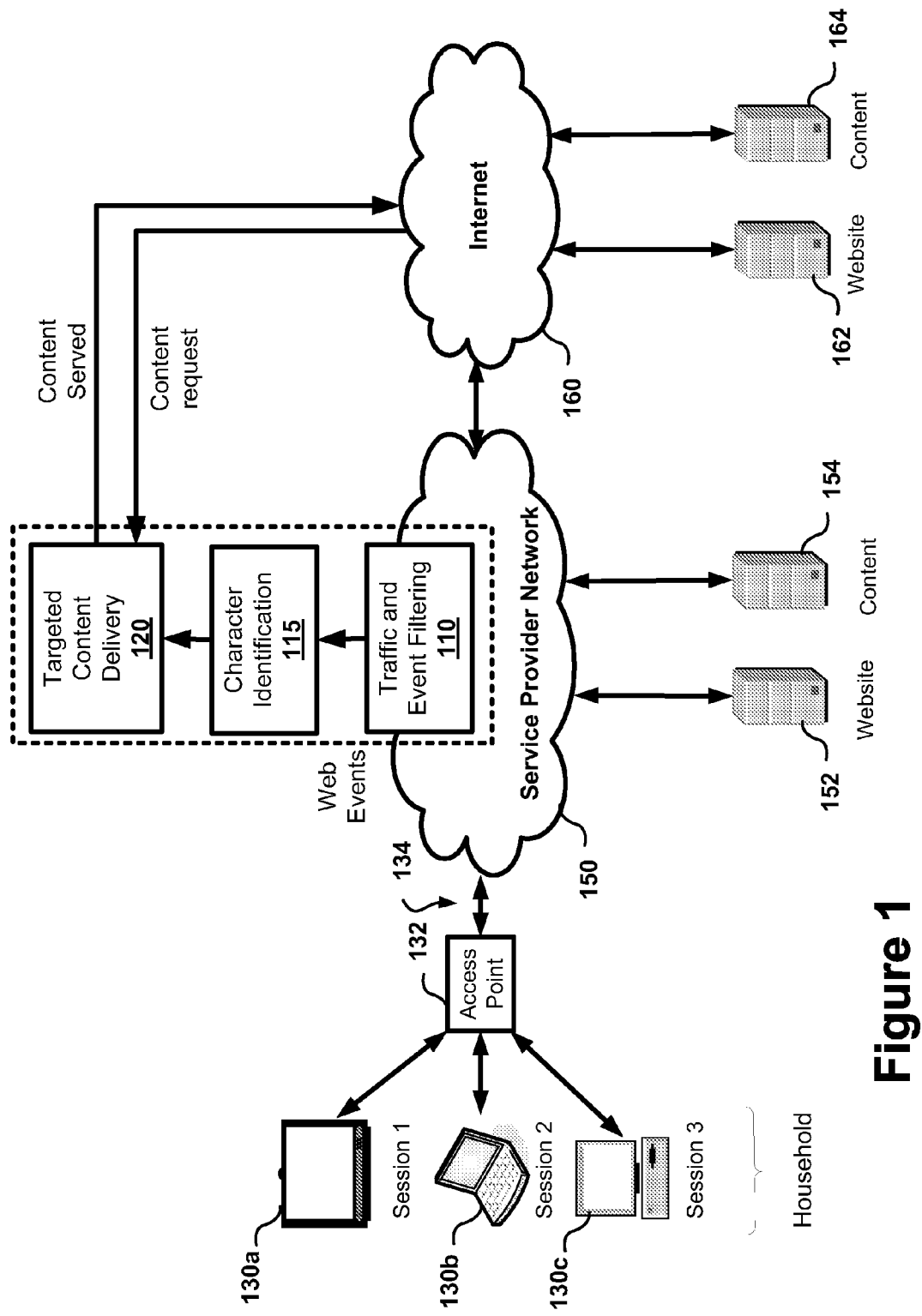
FIG. 1 is a schematic representation of character differentiation based on pattern recognition.

FIG. 1 is a representation of character differentiation based on pattern recognition in a typical operating environment. Character or personality differentiation can be defined in the context of a broadband data communication network (e.g. the Internet). Alternative it can be used in other contexts such as, for example, a digital TV distribution network or other similar information communication mechanisms provided by a network service provider 150.

The service provider may be any provider such as an Internet service provider (ISP) or network carrier, such as a wireless network carrier, providing a network 150 to enable subscribers to use computing device to access network based services. The users of an household, the subscriber to the service provider, are connected to the service provider network 150 by an access point 132 provided by a modem such as for example a digital subscriber line (DSL), Data Over Cable Service Interface Specification (DOCSIS), or wireless modem. The users access the network using networked computing devices such as Internet Protocol television (IPTV) or settop boxes 130a, mobile devices such as laptops, notebooks or netbooks 130b, desktop computing devices 130c to access content provided by connection endpoints such as web services or content servers coupled to the network. The service provide network 150 may provide direct access to web services provided from within the network, such as websites 152 or other content sources 154, or to services coupled to the Internet 160 (or other public communication network), such as website 162 or content sources 164. The traffic and event filtering 110 receives network application data such as subscriber traffic 134 from subscribers 130a-130c via access point 132 transiting network 150 and generates web events based upon the received traffic. The traffic may be to website servers 152 or content servers 154 coupled to or within the service provider network 150 or to an external network 160 such as website server 162 and content servers 164 which may be connected via a network such as the Internet.

The events are processed and assigned to a session originating from the access point 132 from a household or defined location. The filtered events are then provided to character identification unit 115 with a session identifier. The character identification unit 115 determines the character associated with the session by generating a fingerprint based upon associated web events and assigns a character ID. A targeted content delivery unit 120 processes the web events and utilizes the data to generate user profiles associated with web events and the character ID to enable targeted content to be provided to the users within the household.

The traffic and event filter 110 provides events from a network connection (e.g. a DSL line) 134 to the character identification module 115. The types of events that can be identified can be specific to the information communication context (i.e. the application) Events can include page views, ad views, ad clicks or search events in the case of Internet traffic across an ISP network. In the case of a set-top box or media application, events can include TV-channel-change or media-consumption-metadata. The events are identified by a subscriber id and by a session id that effectively provides the character identification module 115 with a stream of events for each concurrent session coming from a household or subscriber connection 134. The connection 134 is between a location (e.g. a household), having a plurality of computing platforms and/or browsers 130a-130c, and a network infrastructure (e.g. ISP network) 150. The household id is an identifier used to distinguish one subscriber (household) from another. The session id is assigned by the traffic and event filter.

The character identification module 115 applies algorithms to recognize patterns in the event stream to match the stream to a known character. If a match is not found, a new character is created. To prevent proliferation of characters from anomalous one-off sessions, an additional aggregate character representing the entire event stream for the household is maintained so that a base level of targeting may be utilized.

The pattern recognition algorithm is designed to be modular. That is that the logic/rules applied in the algorithm can be changed and/or supplemented. The algorithm can, for example, take into account various factors of the initial activities of a user's browsing session. A fingerprint can be determined for a session by considering the first 'n' (i.e. a configurable number of) browsing events after a configurable period of inactivity of the connection. Additional factors that can be considered in the algorithm include the time-of-day or day of the week that the session occurs in as well as a classification of the websites that were visited (i.e. pages viewed). A session fingerprint is primarily a 'feature vector' in which features have been selected to represent important information that will distinguish one browsing session from another. Features used in the case of an Internet advertising application can include a vocabulary of words and tokens that are commonly present in the website host names that a user browses, as well as time-of-day and major category information. In the case of a set-top box or media application, exemplary features can include channel change events, time-of-day events or metadata information including program title names, descriptions and categories (e.g. sports, movies, drama).

Multiple algorithms can be used simultaneously in a live (i.e. active) session to allow for A/B comparisons to determine the effectiveness of tuning the various parameters of the system. The comparison of multiple active algorithms can be used to determine the most effective algorithm by determining the relative effectiveness at selecting appropriate content. For example, in an Internet advertising application, if one algorithm is consistently better at presenting ads that are clicked by the user, that algorithm is much more effective than the alternate algorithm.

Unlike traditional systems that attempt to track individual users, the character identification module 115 attempts to match characters exhibited during a browsing or other content consumption session. In the case of two members of a household that share similar interests and behaviors, they will be identified as the same character for targeting purposes. There is no personally identifiable information (PII) used in the selection of characters.

Figure 2:
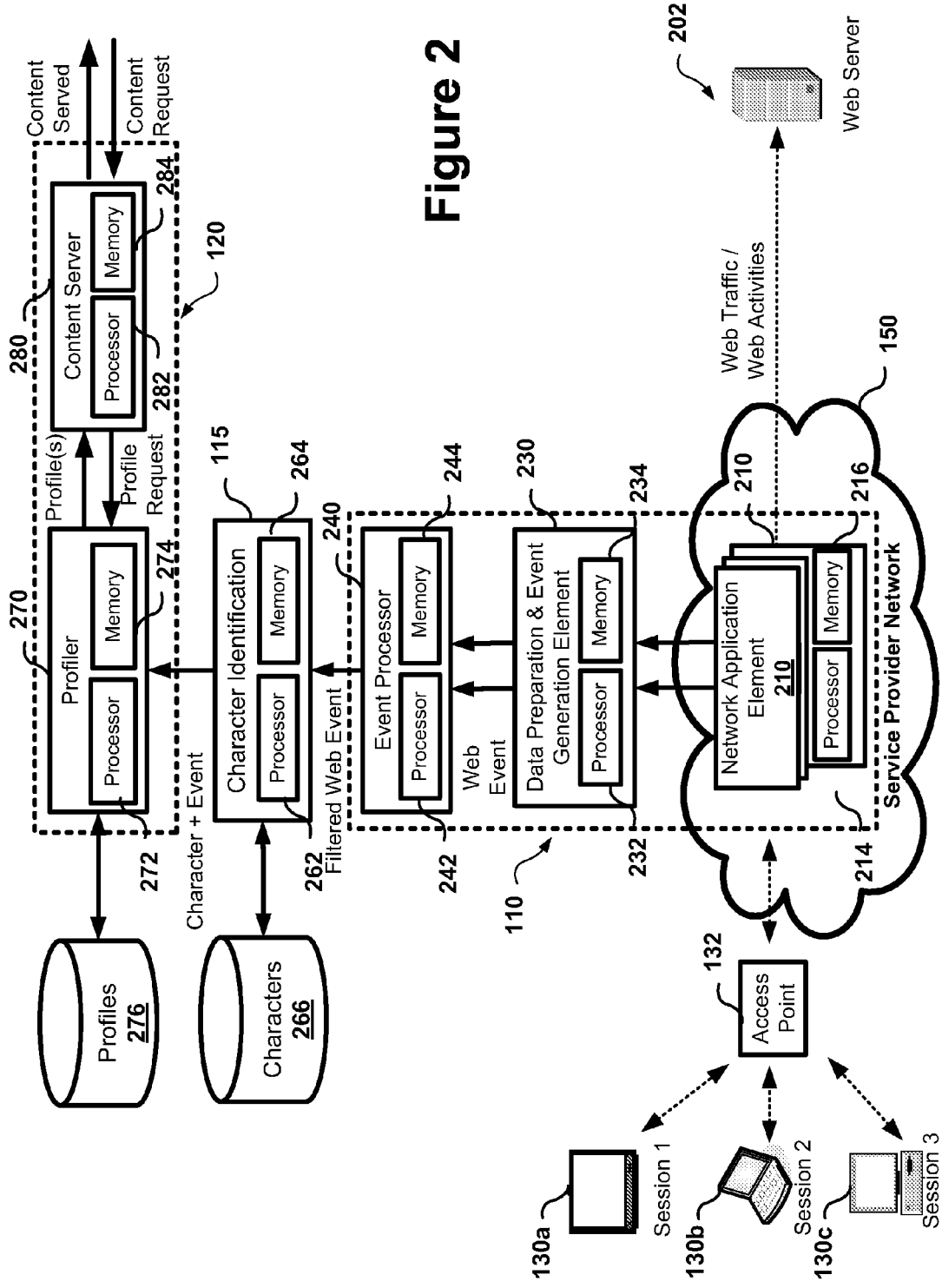
FIG. 2 is a schematic representation of a system providing character differentiation in profile selection.

As shown in FIG. 2, subscriber 130 household, accesses content from web server 202 through service provider network 150. The server 202 may be may be directly connected to network 150, such as servers 152 and 154, or may be coupled to an external network 160 such as servers 162 and 164 which may be connected via a network such as the Internet. The traffic and event filtering unit 110 comprises one or more elements or devices deployed within the service provider network 150 or coupled to the service provider network 150.

The elements can comprise one or more network application elements 210 deployed in the service provider network. Each network application unit 110 comprises at least a processor 214, memory 216 and a network interface (not shown), one or more data preparation and event generation elements 230 comprising at least a processor 232, memory 234 and a network interface (not shown). An event processor 240 comprising at least a processor 242, memory 244 and a network interface (not shown) provides filtered web events to a character identification unit 115, comprising at least a processor 262 and memory 264 and a network interface (not shown). The character identification unit 115 may also provide storage 266 for the determine characters. Once a character fingerprint has been assigned, the web event and the determined character identifier are provided to the profiler 270 comprising at least a processor 272, memory 274 and a network interface (not shown). The profiler 270 maintains user preference profile associated with each determine character with may be provided in storage 276 for retrieval as required. A content server 280 comprising at least a processor 282, memory 284 and a network interface (not shown), retrieves profile information from the profiler and selects appropriate content for the profile to be delivered to the end user. Although the network application unit 110 and the targeted content delivery unit 120 are described as comprising individual elements and/or units each being executed by individual processors and memory, the functionality of the network application unit 110 and the targeted content delivery unit may each be consolidated and executed on a single processor or computing platform depending on network topology. Similarly, the functionality may be distributed across multiple computing platforms as required.

The network application unit 110 supports capturing and processing of network application data, web traffic or web activities, between the subscriber 120 and the web server 202. The term 'web' refers to the accessing network accessible data comprising content such as text, images, videos, and other multimedia using hyperlinks The network application element 210 also supports exporting or allows external access of these web traffic activities. Web traffic is typically hypertext transfer protocol (HTTP)-based traffic that uses transmission control part (TCP) port 80. Web activities are summarized web traffic that can, for example, include: website visit, video download, e-Commerce interaction on website, search performed, and other similar Internet activities. A network application unit 110 can comprise one or more types of network application elements 210 based upon the integration within the service provider network. The network application elements may be incorporated in the communication path between the access point and communication end point or adjunct to the communication path where copies or duplicates of the events are forwarded to the network application element from a device within the communication path.

Each data preparation and event generation element 230 provides for interfacing with one or more of network application elements 210 (of various types) and is responsible for accessing the network application data such as web traffic or web activities that are alternatively forwarded or logged by the network application elements 210. After receiving the web traffic or web activities, the data preparation and event generation element 210 is responsible for eliminating unnecessary data (e.g. removing the content portion of HTTP web traffic, removing the content portion of a web based video stream, etc.) and ultimately formulating the web traffic/activities into well-defined web events for down stream processing. Examples of web events are search events, website visit events, advertisement (ad) click events, e-Commerce interaction events, online video selection events, and other similar events. These events, accompanied by a subscriber identifier (ID) such as, for example, an Internet Protocol (IP) address associated with the subscriber household 130, are sent to targeted content delivery unit 120 for processing.

The event processor 240 provides for collecting and aggregating events from the data preparation and event generation elements 230. The network application data such as web events are further filtered (e.g. by eliminating any personal or sensitive information). The events and the associated session ID are processed by the character identification unit 115. The character identification unit 115 determines a fingerprint for the session and determines a character identifier 266 for the session, as described in connection with FIG. 4, and forwards the web events, subscriber identifier and character identifier to the profiler 270 for further processing.

The profiler 270 is a real-time component within the targeted content delivery unit 120. The profiler 270 takes each filtered web event, subscriber ID and character ID, from the event processor 240 as input and generates or updates stored profiles 276 using the one or more profiling algorithms. The profile can be related to character interests within the subscriber household. The profiler 270 operates in real-time and the generated profiles are made available to the content server 280.

The content server 280, upon receiving a request for targeted content (e.g. an advertisement, a video clip, a music file, etc.) from a content user, queries the profiler 270 for profile information related to the content user; and/or profile information related to the context of the request (e.g. this might include the context of the content provider, publisher, genre of the requested content, etc.). The content server 280 can request, from the profiler 270, profile information generated using one or more profile modelling algorithms. Based on the received profile information, the most appropriate piece of content is selected and served to the content user. The selection criteria can be based on relevancy to the user, revenue-generating ability, or other business rules related to the content user or the targeted content. The content server 280 can choose to use profile information generated using different profile modelling algorithms on successive targeted content requests in order to conduct A/B testing (i.e. alternative comparison) to optimize performance on an ongoing basis.

Figure 3:
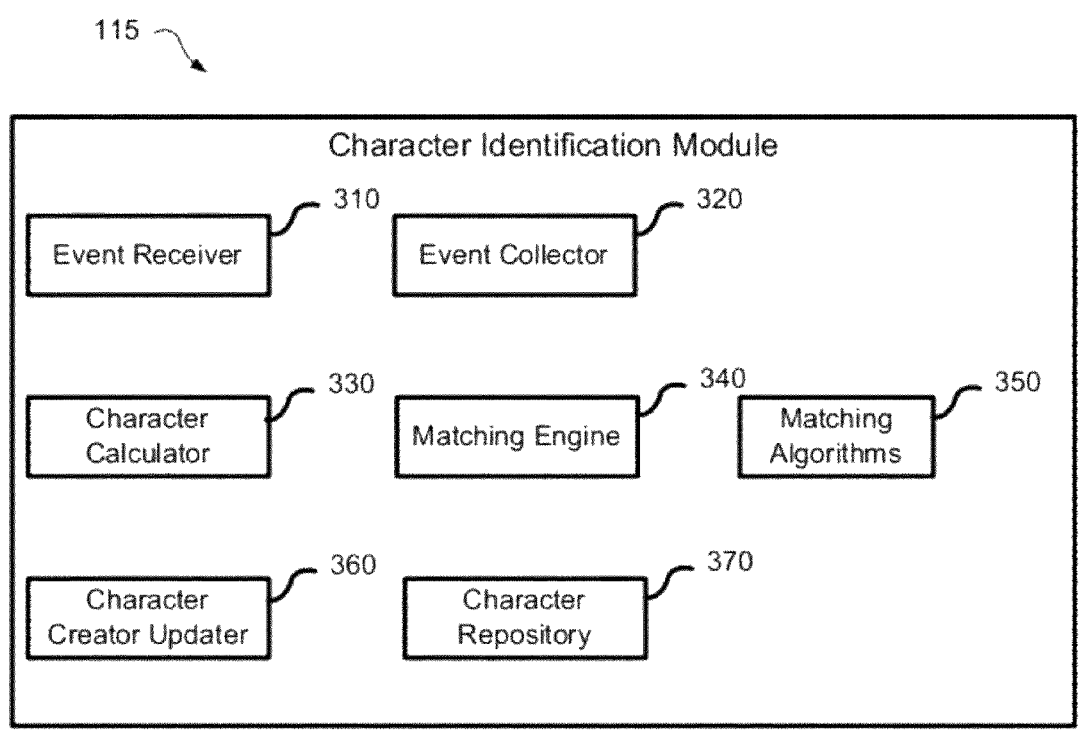
FIG. 3 is a schematic representation of an apparatus for character differentiation based on pattern recognition.

FIG. 3 is a schematic representation of the character identification module 115 for character or personality differentiation based on pattern recognition. The character identification module 115 comprises an event receiver 310, an event collector 320, a character calculator 330, a matching engine 340, a repository of matching algorithms 350, a character creator/updater 360 and a character repository 370. The event receiver 310 receives event traffic and extracts a household ID and a session ID. The event collector 320 provides for events to be stored until there are a sufficient number for processing.

The character calculator 330 provides for generating a character fingerprint based on a plurality of events occurring in a session. The matching engine 340 provides for matching a candidate character with one of a plurality of known characters. Matching is based on matching algorithms provided by the matching algorithm repository 350. The character creator/updater 360 provides for creating a new character and for updating the fingerprint of an existing character. A plurality of characters can be stored in and retrieved from the character repository 370 which may be coupled to an external storage repository 266.

The method according to the present disclosure can be implemented using the character identification module 115 described above with reference to FIGS. 1 to 3. Alternatively, the method according to the present disclosure can be implemented using computer executable program instructions stored on a computer-readable storage memory.

Figure 4:
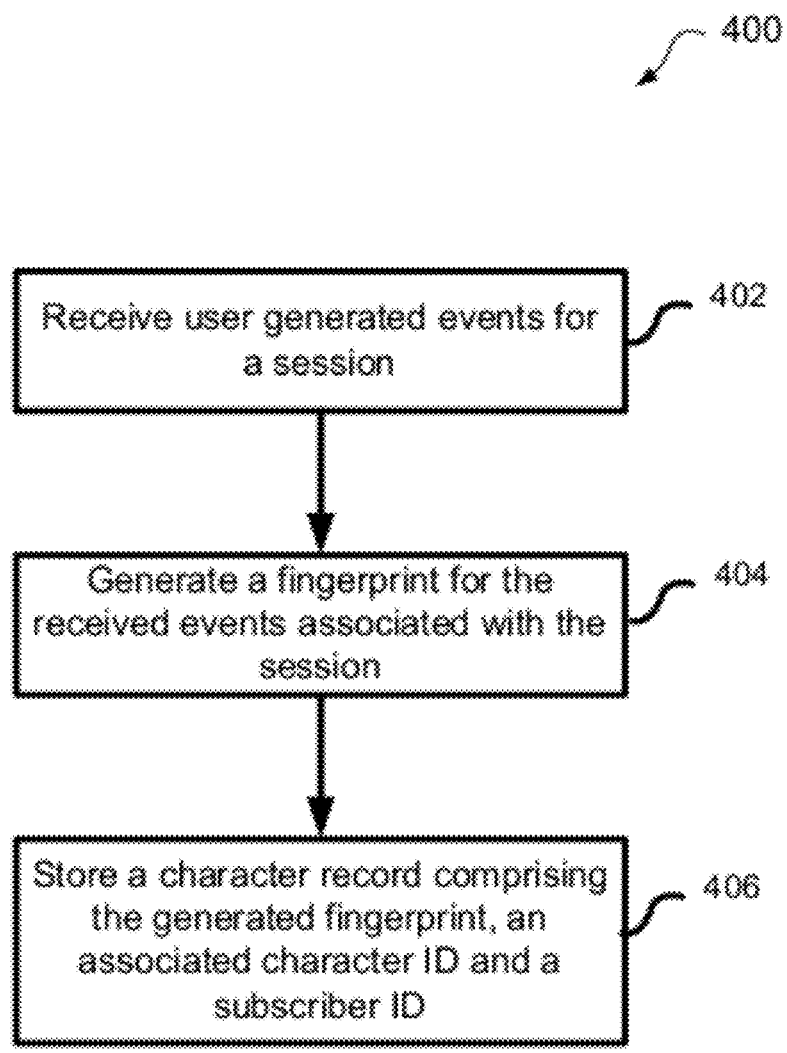
FIG. 4 is a flow diagram representing a method for generating a character fingerprint.

FIG. 4 is a flow diagram representing a method 400 for character or personality differentiation based on pattern recognition. The generated events are received at 402 from one of a plurality of computers, in a household, connected to an access point. Each event is associated with a subscriber identification (ID) and a session identification (ID) and generated by with a communication session between one of the plurality of computing devices and a communication endpoint, such as a web server or content through, the network. At 404 a session fingerprint is generated using a plurality of received events for the associated subscriber ID and session ID. The session fingerprint comprises a feature vector based upon data contained in the received events. A character record is then stored at 406, the record comprises the generated fingerprint, an associated character identifier (ID) and the subscriber ID.

Figure 5:
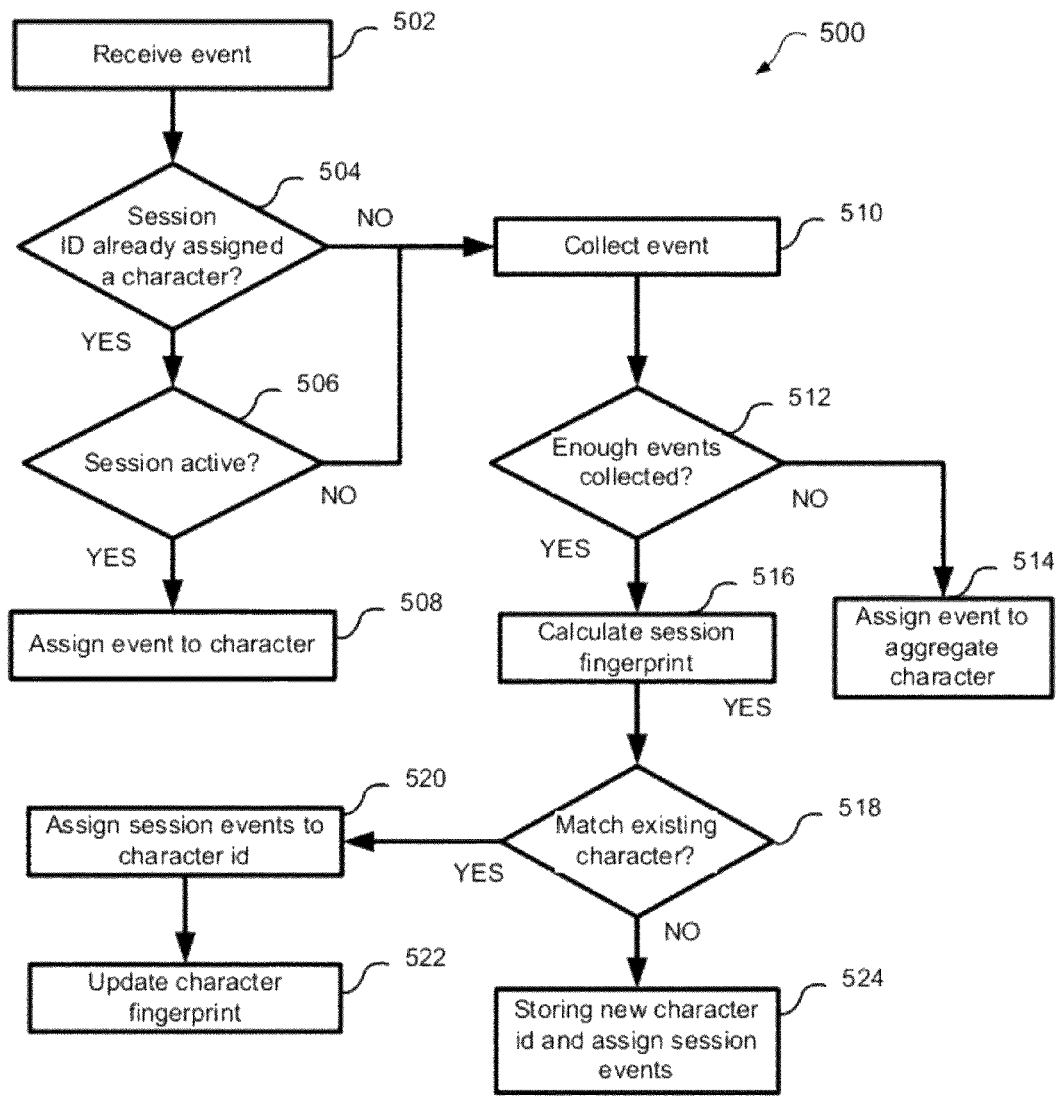
FIG. 5 is a flow diagram representing a method for character differentiation based on pattern recognition.

FIG. 5 is a flow diagram representing a method 500 for character or personality differentiation based on pattern recognition. An event is received at 502, the event is associated with a household ID (or subscriber ID) and a session ID. The session ID is assigned by the traffic and event filtering 110 based upon OS fingerprinting and session detection techniques. The session ID is also based upon a defined period of usages where periods of inactivity restart a session.

For each incoming event, a check is made at 504 to determine if the session has already been assigned a character. When the session ID has already been assigned to a character, YES at 504, a determination is made as to whether the session has recently been active at 506. When the session has been active, YES at 506, the event is assigned to the character associated with the session at 508 and the event is forwarded to the content delivery unit 120 to determine an associate profile. Determination of session activity may be based upon a defined time interval, such as 15 minutes, in which associated events must be received to maintain session as active.

When there has been no recent activity on the session, NO at 506, events are collected at 510. A determination is made as to whether enough events have been received to perform the pattern-matching algorithm. Until enough events have been received to assign a character, NO at 512, each event is assigned to an aggregate household character at 514.

Once the required events have been collected, YES at 512, the session character fingerprint is calculated at 516. Each character fingerprint is represented as a feature vector that represents the attributes of the initial portions of a browsing session. The fingerprint is comprised of tokens from a vocabulary list based on, for example, the first 5 (this can be tuned) events of a web browsing session. Specifically the host name from the web event is broken down into tokens. These tokens form the feature vector that represent a term associated with a host name and a weight defining the occurrence of the term in collected events. By adding together the feature vectors for each of the five events, a feature vector that represents the fingerprint of the session is generated. A sample fingerprint is shown in Table 2.

The calculated character is compared with existing known characters at 518 for the household. The matching algorithm is not absolute (i.e. a perfect match is not necessary to conclude that it is the same character). The initial matching algorithm utilized is an application of an adaptation of well known natural language processing.

Multiple feature vectors can be compared for similarity using a technique such as cosine similarity. The matching algorithm, such as cosine similarity, comprises a calculation to determine the angle between two vectors. Cosine similarity is known approach in text mining and data mining. It measures the similarity between two vectors of equal dimensions by looking at the cosine of the angle between them. The output of the algorithm is a score between 0 and 1. When the angle between the session fingerprint and the character fingerprint is small, the sessions are considered to be matched. The threshold used to determine that two sessions are matched can be tuned and configured to achieve a desire level of matching.

If similarity between the best match and the current session is above a certain threshold (for example 0.5), then that character is chosen, YES at 518, all events from that session are assigned to the known character at 520 and the fingerprint is updated at 522. If there is an existing character fingerprint and the current session's character fingerprint are averaged, and the existing character is updated (i.e. replaced) with a result of the averaging. This means that characters are continually learning to incorporate small differences in the initial character fingerprint.

When an appropriate match cannot be found within the existing characters, NO at 518, a new character is created that reflects the new initial browsing behavior that has been observed at 524. A limit can be defined as to how many characters can be defined for a household as well as an aging process that is used to remove characters that have not recently being observed from the household and replaced by the new character. The character associated with the session and the event is forwarded to the content delivery unit 120.

The character data structure may be defined in a record such as in Table 1.

TABLE 1

Character structure

| | |
|---|---|
| Household ID | <INTEGER> |
| Character ID | <INTEGER> |
| Last Activity Time | <TIMESTAMP> |
| Fingerprint | <RECORD> |

The household ID may be based upon any number of identifiers such as IP address, radius client; user logon identifier or any static data associated with the household access point The character ID is an identifier to uniquely identify the character. An activity time stamp identifying the last update or creation of the character. Each character has an associated fingerprint as shown in Table 2.

TABLE 2

Fingerprint structure

| Index | Weight |
|-------|--------|
| 75    | 1      |
| 132   | 2      |
| 198   | 1      |
| 345   | 1      |
| 364   | 4      |

The fingerprint represents a session with 5 unique tokens, with a total of 9 occurrences between them. The feature vector is sparsely stored. Any indices for which the corresponding token did not occur, is simply not stored. The index maps to a source index of terms found in or associated with event metadata or terms identified in the Universal Resource Locator (URL) of the event.

It will be apparent to one skilled in the art that numerous modifications and departures from the specific embodiments described herein may be made without departing from the spirit and scope of the present disclosure.

The invention claimed is:

1. A method of character differentiation of on-line communications originating from a subscriber access point coupled to a network, the method comprising:
   receiving user generated events from one of a plurality of computing devices coupled to the access point, each event associated with a subscriber identification (ID) and a session identification (ID), the events generated by a communication session between one of the plurality of computing devices and a communication endpoint through the network;
   generating a session fingerprint using a plurality of received events for the associated subscriber ID and session ID wherein the session fingerprint comprises a feature vector based upon data contained in the received events; and
   storing a character record comprising the generated fingerprint, an associated character identifier (ID) and the subscriber ID.

2. The method of claim 1 wherein the feature vector comprises tokens, each token indexed to a term defined in vocabulary list, the tokens determined based upon communication endpoint location information provided by the received events.

3. The method of claim 2 wherein each token further comprises a weight associated with token defined in the feature vector, the weight defining the relative occurrence of the token in the received events.

4. The method of claim 3 wherein the tokens are defined by host names identified in the event, the tokens form the vector that represent the host name.

5. The method of claim 2 wherein the feature vector features selected form the list comprising: a channel change events, time-of-day events, and metadata information including program title names, descriptions and categories.

6. The method of claim 1 wherein the features include a vocabulary of words commonly present in website host names, as well as time-of-day and major category information.

7. The method of claim 1 further comprising determining if the character record is active within a defined time interval, wherein if character record is active, the character record is updated with the received events.

8. The method of claim 1 wherein prior to storing the character record, the method further comprising comparing the session fingerprint to one or more stored fingerprints, each associated with a character record sharing a common subscriber ID, to determine if a character fingerprint has already been identified.

9. The method of claim 8 wherein comparing the fingerprints is performed by a matching algorithm to provide a similarity indicator between the determined fingerprint and the stored fingerprints, the matching algorithm providing a value between 0 and 1.

10. The method of claim 9 wherein if the similarity is greater than 0.5 a match is declared and the feature vectors are updated based upon the received events.

11. The method of claim 10 wherein the matching algorithm is a cosine similarity algorithm.

12. The method of claim 1 determining if the received events are associated with an existing active session is further defined based upon an active time interval in which associated events must be received to maintain character record as active.

13. The method of claim 1 wherein the comparing the fingerprint further comprises comparing a time-of-day or day of the week associated with the character record.

14. The method of claim 13 further comprising comparing a classification of websites that were visited.

15. The method of claim 1 wherein the events define a HTTP request portion between the computing device and communication endpoint.

16. The method of claim 1 wherein the session ID is assigned by OS fingerprinting technique to distinguish active communication sessions originating from the same access point.

17. The method of claim 1 wherein the access point is selected from the group comprising:
   a digital subscriber line modem; a Data Over Cable Service Interface Specification (DOCSIS), and a wireless modem.

18. The method of claim 1 wherein the character ID, subscriber identifier and received events are used to determine an associated content preference profile used from determining applicable content to be provided to a user associated with the session based upon user content preferences.

19. A character identification apparatus for character differentiation of on-line communications originating from a subscriber access point coupled to a network, the module comprising:
   a processor;
   a memory providing instructions for execution by the processor, the instructions for:
      receiving user generated events from one of a plurality of computing devices coupled to the access point, each event associated with a subscriber identification (ID) and a session identification (ID), the events generated by a communication session between one of the plurality of computing devices and a communication endpoint through the network;
      generating a session fingerprint using a plurality of received events for the associated subscriber ID and session ID wherein the session fingerprint comprises a feature vector based upon data contained in the received events; and
      storing a character record comprising the generated fingerprint, an associated character identifier (ID) and the subscriber ID.

20. A computer readable memory storing instructions for execution by a processor, the instructions for performing character differentiation of on-line communications originating from a subscriber access point coupled to a network, the instructions comprising:

receiving user generated events from one of a plurality of computing devices coupled to the access point, each event associated with a subscriber identification (ID) and a session identification (ID), the events generated by a communication session between one of the plurality of computing devices and a communication endpoint through the network;

generating a session fingerprint using a plurality of received events for the associated subscriber ID and session ID wherein the session fingerprint comprises a feature vector based upon data contained in the received events; and storing a character record comprising the generated fingerprint, an associated character identifier (ID) and the subscriber ID.

* * * * *